United States Patent
Emura et al.

(10) Patent No.: US 7,382,372 B2
(45) Date of Patent: Jun. 3, 2008

(54) APPARATUS AND METHOD FOR CREATING MOVING PICTURE

(75) Inventors: Koichi Emura, Yokohama (JP); Shuji Morii, Shibuya-ku (JP); Hiroshi Yasuda, Yokohama (JP); Terumasa Aoki, Kamifukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 185 days.

(21) Appl. No.: 10/565,513

(22) PCT Filed: Jul. 22, 2004

(86) PCT No.: PCT/JP2004/010757

§ 371 (c)(1),
(2), (4) Date: Jan. 23, 2006

(87) PCT Pub. No.: WO2005/008599

PCT Pub. Date: Jan. 27, 2005

(65) Prior Publication Data

US 2006/0181541 A1 Aug. 17, 2006

(30) Foreign Application Priority Data

Jul. 23, 2003 (JP) .............................. 2003-278401

(51) Int. Cl.
*G06T 15/00* (2006.01)

(52) U.S. Cl. ...................... 345/473; 345/474; 345/475; 463/31

(58) Field of Classification Search ........ 345/473–475, 345/581; 463/31–33
See application file for complete search history.

(56) References Cited

U.S. PATENT DOCUMENTS

| | | | | |
|---|---|---|---|---|
| 5,830,066 A | * | 11/1998 | Goden et al. | 463/33 |
| 5,892,507 A | * | 4/1999 | Moorby et al. | 715/500.1 |
| 5,954,332 A | * | 9/1999 | Mero et al. | 273/236 |
| 6,126,544 A | * | 10/2000 | Kojima | 463/31 |
| 6,633,293 B1 | * | 10/2003 | Kojima | 345/473 |

FOREIGN PATENT DOCUMENTS

| | | |
|---|---|---|
| JP | 8-263681 | 10/1996 |
| JP | 11-195135 | 7/1999 |
| JP | 2001-6001 | 1/2001 |
| JP | 2002-366964 | 12/2002 |

OTHER PUBLICATIONS

English language Abstract of JP 2002-366964, Dec. 2002.
English language Abstract of JP 8-263681, Oct. 1996.
English language Abstract of JP 11-195135, Jul. 1999.
English language Abstract of JP 2001-6001, Jan. 2001.

* cited by examiner

*Primary Examiner*—Phu K. Nguyen
(74) *Attorney, Agent, or Firm*—Greenblum & Bernstein, P.L.C.

(57) ABSTRACT

The present invention extracts information related to rendering from structured scenario description 101 that describes information related to objects and the rendering, extracts a rendering setup corresponding to information related to the extracted rendering from rendering knowledge base 109, extracts a moving picture corresponding to the objects described in structured scenario description 101 from moving picture component database 106 and produces rendering on the extracted moving picture using the extracted rendering setup, and can thereby create a moving picture subjected to effective rendering.

8 Claims, 21 Drawing Sheets

```
<?xml version="1.0"?>
<Schema targetNamespace="urn:dmp:schema:20030310" xmlns:dmp="urn:dmp:schema:20030310"
  xmlns:mpeg7="urn:mpeg:mpeg7:schema:2001" xmlns="http://www.w3.org/2001/XMLSchema"/>
  <import namespace="urn:mpeg:mpeg7:schema:2001" schemaLocation="./Mpeg7-2001.xsd"/>

<complexType name="DMPMLBaseType" abstract="true">
  <complexContent>
    <restriction base="anyType"/>
  </complexContent>
</complexType>

<complexType name="DMPMLType" abstract="true">
  <attribute name="id" type="ID" use="optional"/>
  <attribute ref="xml:lang" use="optional"/>
</complexType>

<element name="DMPML">   ~ 201
  <complexType>
    <complexContent>
      <extension base="dmp:DMPMLType">
        <sequence>     ~ 202
          <element ref="Dramatics" type="dmp:DramaticsType" minOccurs="0"/>
          <element ref="Screenplay" type="dmp:ScreenplayType"/>   ~ 203
        </sequence>
      </extension>
    </complexContent>
  </complexType>
</element>
```

FIG. 2

```
<element name="Dramatics" type="Dramatics"/>
<complex name="DramaticsType">
  <sequence>
    <element name="DirectorName" type="string" minOccurs="0"/>
  </sequence>
  <attribute name="touch">  ~ 301
    <simpleType>
      <restriction base="string">
        <enumeration value="Movie"/>      ~ 303
        <enumeration value="TV Drama"/>   ~ 304
        <enumeration value="Theatrical"/> ~ 305
        <enumeration value="News"/>       ~ 306
        <enumeration value="Sports"/>     ~ 307
        <enumeration value="Animation"/>  ~ 308
        <enumeration value="CF"/>         ~ 309
      </restriction>
    </simpleType>
  </attribute>
  <attribute name="genre">  ~ 302
    <simpleType>
      <restriction nase="string">
        <enumeration value="S.F."/>    ~ 310
        <enumeration value="Horror"/>  ~ 311
        <enumeration value="Action"/>  ~ 312
        <enumeration value="Comedy"/>  ~ 313
        <enumeration value="Sitcom"/>  ~ 314
      </restriction>
    </simpleType>
  </attribute>
</complexType>
```

```
<element name="Screenplay" name="ScreenplayType">
<complexType name="ScreenplayType">
  <sequence>
401 — <element name="Title" type="mpeg7:TitleType"/>
402 — <element name="Author" type="string" minOccurs="0"/>
403 — <element name="Copyright" type="mpeg7:UniqueIDType" minOccurs ="0"/>
    <sequence maxOccurs="unbounded">
404 — <element ref="Transition" type="dmp:TransitionType" minOccurs="0"/>
405 — <element ref="Scene" type="dmp:SceneType" minOccurs ="0"/>
    </sequence>
  <attribute name="id" type="ID" use="optional"/>
</complexType>

<element name="Scene" name="SceneType">
<complexType name="SceneType">
  <sequence>
406 — <element ref="Slugline" type="dmp:SluglineType"/>
    <sequence maxOccurs="unbounded">
407 — <element ref="SceneDirections" type="dmp:SceneDirectionsType" minOccurs ="0"/>
408 — <element ref="Dialogue" type="dmp:DialogueType" minOccurs ="0"/>
    </sequence>
  <attribute name="no" type="positiveInteger"/>
</complexType>
```

FIG. 4

```
<element name="Transition" name="TransitionType"/>
<complexType name="TransitionType">
 <complexContent>
  <restriction base="anyType">
   <attribute name="type">
    <simpleType>
     <restriction base="string">
      <enumeration value="FADE IN:"/>          —— 501
      <enumeration value="FADE OUT:"/>         —— 502
      <enumeration value="CUT TO:"/>           —— 503
      <enumeration value="CUT BACK TO:"/>      —— 504
      <enumeration value="DISSOLVE TO:"/>      —— 505
      <enumeration value="MIX TO:"/>           —— 506
      <enumeration value="LIGHTS UP :"/>       —— 507
      <enumeration value="WIPE TO :"/>         —— 508
      <enumeration value="ZOOM IN:"/>          —— 509
      <enumeration value="ZOOM OUT:"/>         —— 510
     </restriction>
    </simpleType>
   </attribute>
  </restriction>
 </complexContent>
</complexType>
```

```
<element name="Slugline" name="SluglineType">
<complexType name="SluglineType">
 <sequence>
  <element name="BasicLocation" type="mpeg7:TextualType"/> ~ 601
  <element name="Time" type="time" minOccurs="0"/> ~ 602
 </sequence>
 <attribute name="place"> ~ 603
  <simpleType>
   <restriction base="string">
    <enumeration value="INT."/> ~ 605
    <enumeration value="EXT."/> ~ 606
    <enumeration value="I/E."/> ~ 607
   </restriction>
  </simpleType>
 </attribute>
 <attribute name="timeOfDay"> ~ 604
  <simpleType>
   <restriction base="string">
    <enumeration value="DAY"/> ~ 608
    <enumeration value="NIGHT"/> ~ 609
    <enumeration value="DAWN"/> ~ 610
    <enumeration value="DUSK"/> ~ 611
    <enumeration value="CONTINUOUS"/> ~ 612
    <enumeration value="MORNING"/> ~ 613
    <enumeration value="AFTERNOON"/> ~ 614
    <enumeration value="EVENING"/> ~ 615
    <enumeration value="SUNRISE"/> ~ 616
    <enumeration value="SUNSET"/> ~ 617
    <enumeration value="LATER"/> ~ 618
    <enumeration value="MOMENTS LATER"/> ~ 619
    <enumeration value="SAMETIME"/> ~ 620
   </restriction>
  </simpleType>
 </attribute>
</complexType>
```

```
<element name="SceneDirections" name="SceneDirectionsType">
<complexType name="SceneDirectionsType">
  <sequence>
    <element ref="Action" type="dmp:ActionType" maxOccurs="unbounded"/>  ~701
  </sequence>
</complexType>

<element name="Action" name="ActionType">
<complexType name="ActionType">
  <sequence>
                                  702
    <element name="Text" type="mpeg7:TextualType" maxOccurs="unbounded"/>
    <choice minOccurs="0">  703
    <element name="Structure" type="mpeg7:StructuredAnnotationType"/>
    <element name="Phrase" type="mpeg7:DependencyStructurePhraseType"/>
    </choice>    704
  </sequence>
</complexType>
```

FIG. 7

```
<element name="Dialogue" name="DialogueType">
<complexType name="DialogueType">
 <simpleContent>
  <extension base="mpeg7:TextualType">
   <attribute name="characterName" type="string"/>              —801
   <attribute name="characterExtension" use="optional">         —802
    <simpleType>
     <restriction base="string">
      <enumeration value="O.S."/>      —804
      <enumeration value="V.O."/>      —805
      <enumeration value="CONT."/>     —806
      <enumeration value="CONT'D"/>    —807
     </restriction>
    </simpleType>
   </attribute>
   <attribute name="mannerOfSpeaking" use="optional">           —803
    <simpleType>
     <restriction nase="string">
      <enumeration value="whispers"/>                      —808
      <enumeration value="joking"/>                        —809
      <enumeration value="not joking"/>                    —810
      <enumeration value="calm"/>                          —811
      <enumeration value="very calm"/>                     —812
      <enumeration value="excited"/>                       —813
      <enumeration value="reverently"/>                    —814
      <enumeration value="loudly"/>                        —815
      <enumeration value="lovingly"/>                      —816
      <enumeration value="muttering"/>                     —817
      <enumeration value="yelling"/>                       —818
      <enumeration value="to other person"/>               —819
      <enumeration value="shouting to other person"/>      —820
      <enumeration value="saluting other person"/>         —821
      <enumeration value="continuing"/>                    —822
      <enumeration value="into the phone"/>                —823
     </restriction>
    </simpleType>
   </attribute>
```

FIG. 8

```
<attribute name="cameraShot" use="optional">  ───901
  <simpleType>
    <restriction base="string">  ───904
      <enumeration value="C.U."/>  ───905
      <enumeration value="CLOSE UP"/>  ───906
      <enumeration value="CLOSE SHOT"/>  ───907
      <enumeration value="MED. SHOT"/>  ───908
      <enumeration value="MEDIUM SHOT"/>  ───909
      <enumeration value="LONG SHOT"/>  ───911
      <enumeration value="WIDE SHOT"/>  ───912
      <enumeration value="TWO – SHOT"/>  ───913
      <enumeration value="EXTREME CLOSEUP"/>  ───914
      <enumeration value="EXTREME LONG SHOT"/>  ───915
      <enumeration value="MOVING"/>  ───916
      <enumeration value="MOVING SHOT"/>
    </restriction>
  </simpleType>
</attribute>
<attribute name="cameraMovement" use="optional">  ───902
  <simpleType>
    <restriction base="string">
      <enumeration value="DOLLY IN"/>  ───917
      <enumeration value="DOLLY OUT"/>  ───918
    </restriction>
  </simpleType>
</attribute>
<attribute name="cameraPosition" use="optional">  ───903
  <simpleType>
    <restriction base="string">
      <enumeration value="P.O.V."/>  ───919
      <enumeration value="REVERSE P.O.V."/>  ───920
    </restriction>
  </simpleType>
</attribute>
  </extension>
  </simpleContent>
</complexType>
</schema>
```

FIG. 9

```xml
<?xml version="1.0"?>
<DMPML xmlns="urn:dmp:schema:20030310" xmlns:mpeg7="urn:mpeg:mpeg7:schema:2001"
  xmlns:xsi="http://www.w3.org/2001/XMLSchema-instance">
  <Dramatics touch="Movie" genre="S.F.">
    <DirectorName>S.S.</DirectorName>
  </Dramatics>
  <Screenplay>
    <Title xml:lang="en">One Fine Day</Title>
    <Author>Koichi Emura</Author>
    <Copyright>Koichi Emura, 2001</Copyright>
    <Transition type="FADE IN."/>
    <Scene no ="1">
      <Slugline place= "INT." timeOfDay="NIGHT">
        <BasicLocation xml:lang="en">LIVINGROOM</BasicLocation>
      </Slugline>
      <SceneDirections>
        <Action>
          <Text>Michael's friend stands up and is going out of the room. </Text>
        </Action>
      </SceneDirections>
      <Dialogue characterName="Michael">Where are you going to go?</Dialogue>
      <Dialogue characterName="Michael's Friend">To the station.</Dialogue>
      <Dialogue characterName="Michael" mannerOfSpeaking="excited">Good!</Dialogue>
      <SceneDirections>
        <Action>
          <Text>Michael with a twinkle in his eye.</Text>
        </Action>
      </SceneDirections>
      ...
    </Scene>
    <Transition type="MIX TO:"/>
    <Scene no="2">
      <Slugline place="EXT." timeOfDay="DAY">
        <BasicLocation>GARDEN</BasicLocation>
      </Slugline>
      ...
    </Scene>
    <Transition type="FADE OUT:"/>
  </Screenplay>
</DMPML>
```

FIG. 10

| 1300 | TOUCH (1301) | RENDERING GENRE (1302) |
|---|---|---|
| | MOVIE | CONFIGURATION (FRAMING) AND SEQUENCE |
| | | CAMERA POSITION AND DIRECTION (ANGLE) |
| | TV DRAMA | CONFIGURATION (FRAMING) AND SEQUENCE |
| | | CAMERA POSITION AND DIRECTION (ANGLE) |
| | ... | |

FIG.13

| 1400 | GENRE (1401) | RENDERING GENRE (1402) |
|---|---|---|
| | S.F. | CONFIGURATION (FRAMING) AND SEQUENCE |
| | | CAMERA POSITION AND DIRECTION (ANGLE) |
| | HORROR | CONFIGURATION (FRAMING) AND SEQUENCE |
| | | CAMERA POSITION AND DIRECTION (ANGLE) |
| | ... | |

FIG.14

| 1500 | DIRECTOR STYLE (1501) | RENDERING GENRE (1502) |
|---|---|---|
| | A | CONFIGURATION (FRAMING) AND SEQUENCE |
| | | CAMERA POSITION AND DIRECTION (ANGLE) |
| | B | CONFIGURATION (FRAMING) AND SEQUENCE |
| | | CAMERA POSITION AND DIRECTION (ANGLE) |
| | ... | |

FIG.15

| 1602 DIRECTOR STYLE | 1602 RENDERING GENRE | | 1603 TOUCH | 1604 GENRE |
|---|---|---|---|---|
| A | CONFIGURATION (FRAMING) AND SEQUENCE | | MOVIE | S.F. |
| | | | TV DRAMA | S.F. |
| | | | ANIMATION | ACTION |
| | CAMERA POSITION AND DIRECTION (ANGLE) | | MOVIE | S.F. |
| | | | TV DRAMA | S.F. |
| | | | ANIMATION | ACTION |
| | ... | | | |
| B | | | | |

| | 1701 | 1702 | 1703 |
|---|---|---|---|
| 1700 | SCENARIO ACTION | SHOT GROUP GENRE | SHOT GROUP ADAPTABILITY RATIO |
| | RIDE BICYCLE | FULL SHOT FROM RIGHT OF PERSON | 50/100 |
| | | FULL SHOT FROM FRONT OF PERSON | 30/100 |
| | | LONG SHOT | 20/100 |
| | START OF SCENE | LONG SHOT | 100/100 |

FIG.17

| | 1801 | 1802 | 1803 |
|---|---|---|---|
| 1800 | SCENARIO ACTION | SHOT GROUP GENRE | SHOT GROUP ADAPTABILITY RATIO |
| | RIDE BICYCLE | WAIST SHOT | 20/100 |
| | ... | | |

FIG.18

| | 1901 | 1902 | 1903 |
|---|---|---|---|
| 1900 | SCENARIO ACTION | SHOT GROUP GENRE | SHOT GROUP ADAPTABILITY RATIO |
| | RIDE BICYCLE | ... | ... |

FIG.19

| SCENARIO ACTION | SHOT GROUP GENRE (PRECEDING SCENE) | SHOT GROUP GENRE (CORRESPONDING SCENE) | SHOT GROUP GENRE (FOLLOWING SCENE) | SHOT GROUP ADAPTABILITY RATIO |
|---|---|---|---|---|
| RIDE BICYCLE | LONG SHOT | FULL SHOT FROM FRONT OF PERSON | WAIST SHOT | 50/100 |
| | WAIST SHOT | FULL SHOT FROM RIGHT OF PERSON | LONG SHOT | 30/100 |
| ... | | | | |

FIG.20

| 2101 SCENARIO ACTION | 2102 SHOT GROUP GENRE | 2103 SHOT GROUP ADAPTABILITY RATIO |
|---|---|---|
| EXPLANATION OF PLACE | WIDE SHOT | 10/10 |
| | SHOW AROUND | 10/10 |
| DIALOGUE | WAIST SHOT | 40/100 |
| | TWO SHOTS | 30/100 |
| | OVER THE SHOULDER SHOT | 30/100 |
| ACTION | CLOSE UP | 10/10 |
| THRILLING SCENE | RABBIT PAN | 50/100 |
| | SWITCHING OF SHOTS AT SHORT INTERVALS | 30/100 |
| | REDUCE SPACE BEFORE PERSON | 20/100 |
| SCENE TO BE FOCUSED | FOCUS | 10/10 |
| | ZOOM IN | 10/10 |

APPARATUS AND METHOD FOR CREATING MOVING PICTURE

TECHNICAL FIELD

The present invention relates to a moving picture creation apparatus and moving picture creation method for creating moving picture from character strings.

BACKGROUND ART

Conventionally, there is a proposal of a method for automatically creating moving picture corresponding to characters included in character strings (e.g., see Unexamined Japanese Patent Publication No. 2002-366964).

According to this method, a character string is analyzed first and a concept contained in the characters included in the character string is determined. Next, components of moving picture such as story, props (gadgets), background and music and so forth are selected. Then, a series of animation is created using the selected moving picture components.

However, the conventional method only creates a series of animation using the moving picture components related to the objects included in the character string and pays little attention to rendering (here "rendering" has a broad meaning containing both direction which means character animation, camera animation and rendering which means drawing polygon per second) such as the method of taking moving picture (i.e. camera work).

Thus, the conventional method simply arranges moving picture components which produce premeditated actions, which results in similar rendering irrespective of themes of moving pictures. For example, similar camera work applies to all types of moving pictures such as a moving picture related to landscape and a moving picture related to human action. For this reason, the moving pictures created become monotonous pictures unable to emphasize their themes.

DISCLOSURE OF INVENTION

It is therefore an object of the present invention to provide a moving picture creation apparatus and moving picture creation method for creating moving picture with effective rendering.

The present invention is designed to extract information related to rendering from structured scenario descriptions describing information related to objects and rendering, extract rendering setup corresponding to the extracted information related to rendering, extract moving pictures corresponding to the objects described in the structured scenario descriptions and produce rendering using the extracted rendering setup for the extracted moving pictures.

Using the present invention allows moving pictures to be created with effective rendering.

BRIEF DESCRIPTION OF DRAWINGS

FIG. 2 is a first diagram showing a structured scenario scheme according to the above described embodiment;

FIG. 3 is a second diagram showing the structured scenario scheme according to the above described embodiment;

FIG. 4 is a third diagram showing the structured scenario scheme according to the above described embodiment;

FIG. 5 is a fourth diagram showing the structured scenario scheme according to the above described embodiment;

FIG. 6 is a fifth diagram showing the structured scenario scheme according to the above described embodiment;

FIG. 7 is a sixth diagram showing the structured scenario scheme according to the above described embodiment;

FIG. 8 is a seventh diagram showing the structured scenario scheme according to the above described embodiment;

FIG. 9 is an eighth diagram showing the structured scenario scheme according to the above described embodiment;

FIG. 10 illustrates the structured scenario according to the above described embodiment;

FIG. 13 is a third diagram showing the scene rendering template according to the above described embodiment;

FIG. 14 is a fourth diagram showing the scene rendering template according to the above described embodiment;

FIG. 15 is a fifth diagram showing the scene rendering template according to the above described embodiment;

FIG. 16 is a sixth diagram showing the scene rendering template according to the above described embodiment;

FIG. 17 is a seventh diagram showing the scene rendering template according to the above described embodiment;

FIG. 18 is an eighth diagram showing the scene rendering template according to the above described embodiment;

FIG. 19 is a ninth diagram showing the scene rendering template according to the above described embodiment;

FIG. 20 is a tenth diagram showing the scene rendering template according to the above described embodiment;

FIG. 21 is an eleventh diagram showing the scene rendering template according to the above described embodiment;

BEST MODE FOR CARRYING OUT THE INVENTION

With reference now to the accompanying drawings, a moving picture creation apparatus according to an embodiment of the present invention will be explained below.

Figure 1:
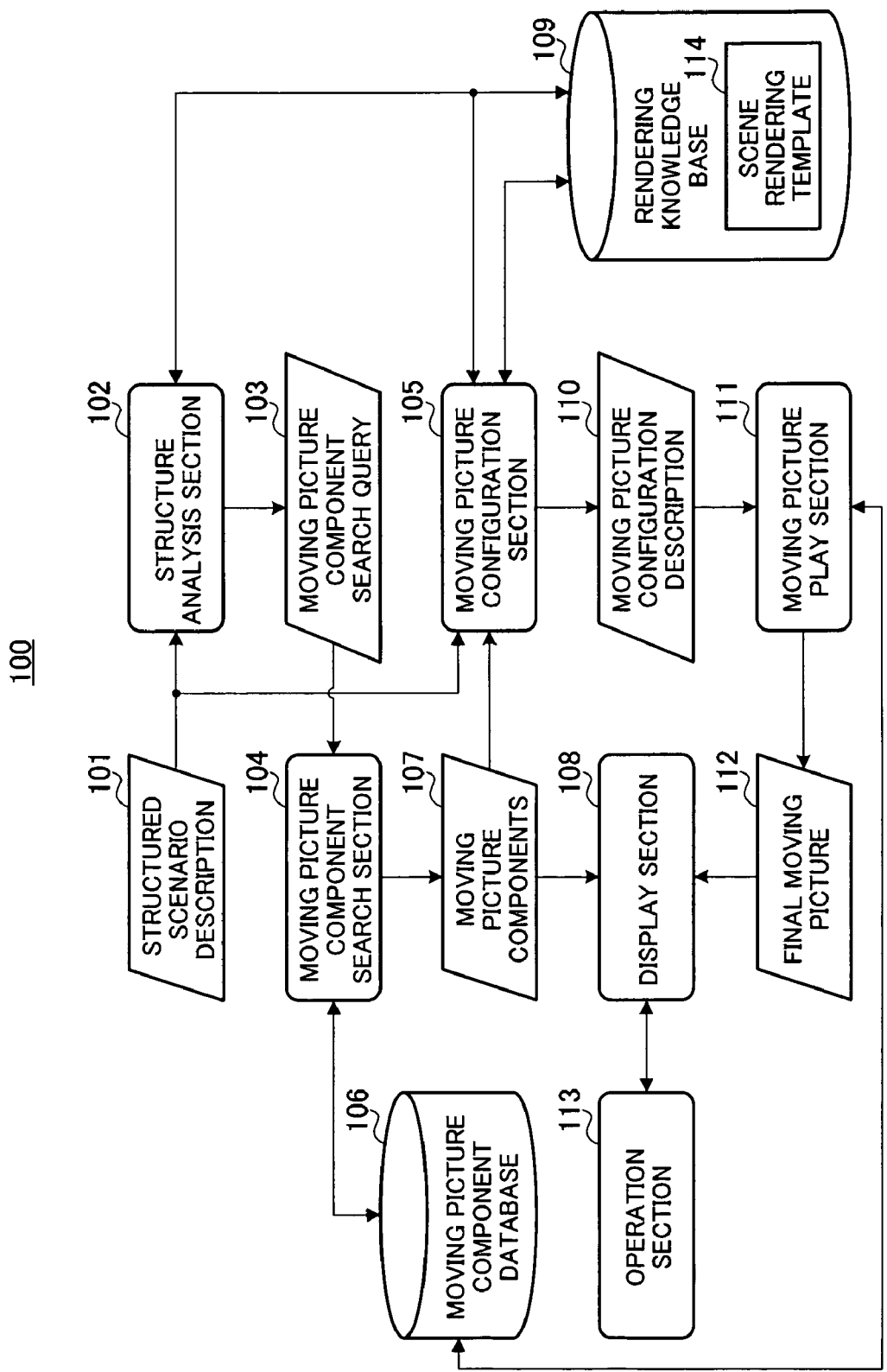
FIG. 1 is a block diagram of a moving picture creation apparatus according to an embodiment of the present invention.

First, the moving picture creation apparatus according to this embodiment will be explained using FIG. 1. FIG. 1 is a block diagram of the moving picture creation apparatus according to this embodiment.

Moving picture creation apparatus 100 according to this embodiment is provided with structure analysis section 102 that receives structured scenario description 101 describing objects making up a scenario and rendering and so forth according to a structured description. Structure analysis section 102 extracts the objects included in structured scenario description 101 and generates moving picture component search query 103. Structure analysis section 102 then sends moving picture component search query 103 to moving picture component search section 104.

Furthermore, structure analysis section 102 extracts the description related to the rendering from structured scenario description 101, selects scene rendering template 114 for the extracted rendering from rendering knowledge base 109 and sends information identifying selected scene rendering template 114 to moving picture configuration section 105.

Details of structured scenario description 101 will be described later.

Rendering knowledge base 109 is a database that stores a plurality of scene rendering templates 114 which store descriptions relating to rendering and rendering setups associated with one another. Details of scene rendering templates 114 will be described later.

Furthermore, moving picture component search query 103 is designed in a format corresponding to the description format of moving picture components stored in moving picture component database 106, capable of searching moving picture components.

Moving picture component database 106 is a database that stores moving picture components corresponding to a plurality of objects. Moving picture component database 106 can take various forms; may be included in moving picture creation apparatus 100 or may be connected to moving picture creation apparatus 100 over a network such as the Internet.

Furthermore, the moving picture components include information related to characters (coordinate values and texture) or information indicating actions (determinant) and so forth.

Moving picture component search section 104 receives moving picture component search query 103 sent from structure analysis section 102 and extracts moving picture component 107 corresponding to moving picture component search query 103 from moving picture component database 106. Moving picture component search section 104 sends extracted moving picture component 107 to moving picture configuration section 105.

Moving picture configuration section 105 receives moving picture component 107 and scene rendering template 114 selected by structure analysis section 102. Next, moving picture configuration section 105 extracts a detailed rendering setup from input scene rendering template 114. Moving picture configuration section 105 then creates moving picture configuration description 110 using the extracted rendering setup for moving picture component 107 and outputs moving picture configuration description 110 to moving picture play section 111.

Furthermore, when no scene rendering template 114 is sent from structure analysis section 102, moving picture configuration section 105 receives structured scenario description 101, extracts the rendering described in structured scenario description 101, uses the extracted rendering for moving picture component 107 to create moving picture configuration description 110 and outputs moving picture configuration description 110 to moving picture play section 111.

Moving picture play section 111 receives moving picture configuration description 110, extracts the moving picture component corresponding to moving picture configuration description 110 from moving picture component database 106 and generates final moving picture 112. Moving picture play section 111 outputs final moving picture 112 to display section 108.

Display section 108 is a display section that displays moving picture component 107 and final moving picture 112.

Operation section 113 is a section for a user to select moving picture component 107 and final moving picture 112 to be displayed on display section 108. That is, operation section 113 is a section for the user to determine desired moving picture component 107 and final moving picture 112 with reference to moving picture component 107 and final moving picture 112 displayed on display section 108.

Note that according to this embodiment, moving picture component search section 104 extracts all moving picture components corresponding to moving picture component search query 103, displays them on display section 108 and allows the user to select one, but the embodiment may also be adapted so that moving picture component search section 104 selects an optimum component from the moving picture components corresponding to moving picture component search query 103 and displays only the optimum component.

Next, structured scenario description 101 will be explained in detail. First, a scheme of structured scenario description 101, that is, a definition of a structured scenario scheme will be explained using FIG. 2 to FIG. 9. FIG. 2 to FIG. 9 show a structured scenario scheme according to this embodiment.

As shown in FIG. 2, structured scenario scheme 200 according to this embodiment defines a structured scenario description through a structured description using XML.

Furthermore, structured scenario scheme 200 defines that the structured scenario description includes element DMPML 201, and element DMPML includes element Dramatics 202 and element Screenplay 203.

Element Dramatics 202 is a description related to rendering and is an element that provides a description using touch and so forth. Detailed rendering setup corresponding to the description in element Dramatics 202 is described in scene rendering template 114 of rendering knowledge base 109.

Furthermore, element Screenplay 203 is an element that provides a description related to a scenario.

Furthermore, as shown in FIG. 3, element Dramatics 202 has attribute touch 301 that indicates touch and attribute genre 302 that indicates genre.

Furthermore, attribute touch 301 has Movie 303 that indicates movie, TV Drama 304 that indicates TV drama, Theatrical 305 that indicates theatrical performance, News 306 that indicates news, Sports 307 that indicates sports, Animation 308 that indicates animation and CF 309 that indicates advertisement, as attribute values.

Note that the attribute value of attribute touch 301 may be anything other than those described above if it at least indicates touch.

Furthermore, attribute genre 302 includes S.F. 310 that indicates SF, Horror 311 that indicates horror, Action 312 that indicates action, Comedy 313 that indicates comedy and Sitcom 314 that indicates serial home comedy, as attribute values.

The attribute value of attribute genre 302 may be anything other than those described above if it at least indicates genre.

Thus, according to structured scenario scheme 200, structured scenario description 101 may provide a description related to touch or genre.

Furthermore, as shown in FIG. 4, element Screenplay 203 includes element Title 401 that indicates title, element Author 402 that indicates author and Copyright 403 that indicates copyright.

Furthermore, element Screenplay 203 includes element Transition 404 that indicates the method of switching between scenes and element Scene 405 that indicates scene, as elements.

Furthermore, element Scene 405 includes Slugline 406 which is a header of a scene as an element.

Furthermore, element Scene 405 includes element SceneDirections 407 that indicates rendering of scene and element Dialogue 408 that indicates dialogue, as elements.

Furthermore, as shown in FIG. 5, element Transition 404 includes: FADE IN: 501 that indicates fade in; FADE OUT: 502 that indicates fadeout; CUT TO: 503 that indicates instantaneous transition to the next scene; CUT BACK TO: 504 that indicates return to a preceding scene; DISSOLVE TO: 505 that fades out a current scene and at the same time fades in the next scene; MIX TO: 506 that mixes the current scene with the next scene; LIGHTS UP: 507 that indicates lighting up of a specific place; WIPE TO: 508 that indicates transition to the next scene through a wipe effect; ZOOM IN: 509 that indicates zoom in; and ZOOM OUT: 510 that indicates zoom out, as attribute values.

Thus, element Transition 404 can describe rendering about switching among many scenes. This allows the user to add rendering about switching among desired scenes to structured scenario description 101.

Note that the sub element of element Transition 404 may be anything other than the above described elements if it at least relates to rendering related to switching between scenes.

Furthermore, as shown in FIG. 6, element Slugline 406 includes element BasicLocation 601 that indicates basic location of scene and element Time 602 that indicates time, as elements.

Furthermore, element Slugline 406 includes attribute place 603 that indicates either internal or external and attribute timeOfDAY 604 that indicates time zone, as attributes.

Attribute place 603 includes INT. 605 that indicates internal, EXT. 606 that indicates external and I/E. 607 that indicates internal and external, as attribute values.

Thus, structured scenario description 101 can describe information indicating internal or external. This allows the user to roughly set the place.

Note that the attribute value of attribute place 603 may be anything other than those described above if it at least indicates place.

Furthermore, attribute timeOfDay 604 includes DAY 608 that indicates daytime, NIGHT 609 that indicates nighttime, DAWN 610 that indicates dawn, DUSK 611 that indicates dusk, CONTINUOUS 612 that indicates continuation of time from the preceding scene, MORNING 613 that indicates morning, AFTERNOON 614 that indicates afternoon, EVENING 615 that indicates evening, SUNRISE 616 that indicates sunrise, SUNSET 617 that indicates sunset, LATER 618 that indicates time after the preceding scene, MOMENTS LATER 619 that indicates time moments after the preceding scene and SAMETIME 620 that indicates the same time as the preceding scene, as attribute values.

Thus, attribute timeOfDay 604 can provide a description related to a time zone. This allows the user to set a desired time zone.

Note that the attribute value of attribute timeOfDay 604 can be anything other than those described above if it at least indicates time zone.

Thus, element Slugline 406 can describe information related to a place of scene and information related to time.

Furthermore, as shown in FIG. 7, element SceneDirections 407 includes element Action 701 that indicates motion or action as an element.

Element Action 701 includes element Text 702 that indicates a character string as an element.

Furthermore, element Action 701 includes Structure 703 that indicates a character string having a structure and Phrase 704 that indicates a character string having a context as sub elements.

Thus, element Action 701 can provide a description related to motion. This allows the user to provide a description related to motion of structured scenario description 101.

Furthermore, as shown in FIG. 8, element Dialogue 408 includes attribute characterName 801 that indicates the name of a character who is speaking, attribute characterExtension 802 that indicates situation of the character who is speaking and mannerOfSpeaking 803 that indicates manner of speaking, as attributes.

Furthermore, attribute characterExtension 802 includes: O.S. 804 that indicates that the character is speaking without being displayed on a screen temporarily (Off Screen); V.O. 805 that indicates that the character is speaking without being generally displayed on a screen in such a case as narration (Voice Over); CONT. 806 that indicates that the character's speaking continues to the next scene (Continue); and CONT'D 807 that indicates that the character's speaking is continued from the preceding scene (Continued) as, attribute values.

Thus, attribute characterExtension 802 can provide a description of information related to a situation in which the character is speaking. This allows the user to set the situation in which the character is speaking to a desired one.

Note that the attribute value of attribute characterExtension 802 can be anything other than those described above if it at least relates to a situation in which the character is speaking.

Furthermore, attribute mannerOfSpeaking 803 includes: whispers 808 that indicates whispering: joking 809 that indicates joking; not joking 810 that indicates that the character is not speaking a joke but a serious thing; calm 811 that indicates the character is speaking calmly; very calm 812 that indicates that the character is speaking very calmly; excited 813 that indicates the character is speaking excitedly; reverently 814 that indicates the character is speaking reverently; loudly 815 that indicates the character is speaking loudly; lovingly 816 that indicates the character is speaking lovingly; yelling 817 that indicates the character is yelling; muttering 818 that indicates the character is muttering; to other person 819 that indicates the character is speaking to the other person; shouting to other person 820 that indicates that the character is shouting to the other person; saluting other person 821 that indicates that the character is saluting the other person; continuing 822 that indicates that the character continues to speak in the same way from the preceding scene; and into the phone 823 that indicates that the character is phoning, as attribute values.

Thus, attribute mannerOfSpeaking 803 can also describe information related to a manner in which the speaker speaks. This allows the user to set the manner in which the speaker speaks to a desired one.

The attribute value of attribute mannerOfSpeaking 803 can be anything other than those described above if it at least relates to a manner of speaking of the speaker.

Thus, element Dialogue 408 can also describe information related to the speaker.

Furthermore, as shown in FIG. 9, element DMPML 201 includes attribute cameraShot 901 that indicates the picture taking method using a camera, attribute cameraMovement 902 that indicates the movement of the camera and attribute cameraPosition 903 that indicates viewpoint for picture taking at the camera position, as attributes.

Attribute cameraShot 901 includes: C.U. 904 and CLOSE UP 905 that indicate close ups for emphasizing a character; CLOSE SHOT 906 indicating picture taking of the character from the head to shoulder; MED.SHOT 907 and MEDIUM SHOT 908 indicating picture taking of the character from the waist up; LONG SHOT 909 and WIDE SHOT 911 indicating picture taking from a location far from the character so as to include more background; TWO-SHOT 912 indicating picture taking of two characters; EXTREME CLOSEUP 913 that is extreme close up picture taking; EXTREME LONG SHOT 914 that is an extremely long shot; and MOVING 915 and MOVING SHOT 916 indicating picture taking while chasing the character as, attribute values.

Thus, it is possible to describe the picture taking method of the camera in attribute cameraShot 901.

This allows the user to explicitly and freely describe a setup about the picture taking method of the camera in the structured scenario description.

The attribute value of attribute cameraShot 901 can be anything other than those described above if it at least relates to an picture taking method of the camera.

Furthermore, attribute cameraMovement 902 includes DOLLY IN 917 indicating picture taking while approaching the character and DOLLY OUT 918 indicating picture taking while moving away from the character, as attribute values.

Thus, it is possible to describe information related to the movement of the camera in attribute cameraMovement 902. This allows the user to set desired movement of the camera in structured scenario description 101.

The attribute value of attribute cameraMovement 902 can be anything other than those described above if it at least relates to movement of the camera.

Furthermore, attribute cameraPosition 903 includes P.O.V. 919 that indicates that the picture is taken from a viewpoint of the character who is a speaker and REVERSE P.O.V. 920 that indicates that the picture is taken from a viewpoint of the character who is a listener, as attribute values.

Thus, it is possible to describe information related to the viewpoint of picture taking in attribute cameraPosition 903. This allows the user to make a setup about a desired viewpoint of picture taking in structured scenario description 101.

The attribute value of attribute cameraPosition 903 can be anything other than those described above if it at least relates to a viewpoint of picture taking.

Thus, various types of information related to camera work can be described in attribute cemeraShot 901.

Furthermore, examples of calculation expressions for determining the camera position will be shown below.

$$\overline{Cp} = \overline{Op} + \overline{Lh} + \left[\frac{|\overline{Lh}|}{\tan\left[\frac{\theta}{2}\right]}\right] \cdot \frac{\overline{Od}}{|\overline{Od}|} \quad \text{(Equation 1)}$$

$$\overline{Lh} = \frac{(\overline{Oth} - \overline{Owh})}{2}$$

$$\overline{Cd} = -\overline{Od}$$

$\overline{Cp}$: Camera Position
$\overline{Op}$: Object Position
$\overline{Oth}$: Object Height
$\overline{Owh}$: Object Waist Height
$\theta$: Angle
$\overline{Od}$: Object Direction
$\overline{Cd}$: Camera Direction This is the configuration of structured scenario scheme 200. Note that it is also possible to give information related to renderings other than those described above to the structured scenario scheme. For example, information related to the number of light sources, positions, colors, genres or special effects such as fog or setup about sound effects and so forth may be added.

Next, a description example of the structured scenario using structured scenario scheme 200 will be explained using FIG. 10. FIG. 10 shows the structured scenario according to this embodiment.

Structured scenario 1000 shown in FIG. 10 includes attribute value Movie 1002 as attribute touch of element Dramatics as shown in 1001 in the figure and S.F. 1003 as the attribute value of attribute genre.

Furthermore, S.S 1004 is described as element DirectorName.

Thus, element Dramatics that indicates rendering of structured scenario 1000 describes a movie as touch, SF as genre and S.S as director rendering (director style).

Furthermore, structured scenario 1000 describes element Screenplay 1005. As shown in 1006 in the figure, element Screenplay 1005 describes One Fine Day as element Title.

Furthermore, element Screenplay 1005 describes Koichi Emura as element Author as shown in 1007 in the figure.

Furthermore, as shown in 1008 in the figure, element Screenplay 1005 describes Koichi Emura, 2001 as element Copyright.

Thus, structured scenario 1000 describes the title, author and copyright, which are information related to the scenario.

Furthermore, element Screenplay 1005 describes two elements Scene as shown in 1009, 1010 in the figure.

Furthermore, FADE IN: 1011 is described as attribute type of element Transition before element Scene 1009.

Furthermore, MIX TO: 1022 is described before element Scene 1010 as attribute type of element Transition.

Furthermore, FADE OUT: 1024 is described after element Scene 1010 as attribute type of element Transition.

Thus, structured scenario 1000 describes information related to switching between scenes.

Furthermore, element Scene 1009 describes INT. 1012 as an attribute value of attribute place and describes NIGHT 1013 as an attribute value of attribute timeOfDay.

Furthermore, element Scene 1009 describes LIVINGROOM 1014 as element BasicLocation.

Thus, structured scenario 1000 describes information related to the place and time related to scene 1009.

Furthermore, element Scene 1009 describes Michael's~room as element SceneDirections.

Thus, structured scenario description 1000 describes actions of the character.

Furthermore, element Scene 1009 describes dialogues of characters in element Dialogue as shown in 1016 to 1018 in the figure.

For example, the example indicated by 1016 in the figure describes Michael as an attribute value in attribute characterName 1019 stating that Michael is saying "Where are you going to go?"

Furthermore, in the example indicated by 1017 in the figure, attribute characterName 1019 describes Michael's friend as an attribute value stating that Michael's friend says "To the station."

Furthermore, in the example indicated by 1018 in the figure, attribute characterName 1019 describes Michael as an attribute value and attribute value mannerOfSpeaking 1021 describes excited as an attribute value stating that Michael is excited and says "GOOD!"

Thus, structured scenario description 1000 provides a description related to dialogue.

As shown above, structured scenario description 1000 describes information related to objects appearing in a moving picture and information related to rendering in a structured form.

What should be noted here is that structured scenario description 1000 includes tagged and structured items necessary for a scenario. This makes it possible to easily extract information related to objects appearing in the scenario and rendering by referencing tags described in structured scenario description 1000.

Furthermore, structured scenario description 1000 describes detailed information related to objects appearing in the scenario and rendering in a tag subordinate to the tag related to the objects appearing in the scenario and rendering. In this way, it is possible to easily recognize detailed information related to objects appearing in the scenario and rendering by referencing the tag subordinate to the tag related to the objects appearing in the scenario and rendering.

Next, scene rendering template 114 stored in rendering knowledge base 109 will be explained using FIG. 11 to FIG. 21. FIG. 11 to FIG. 21 show scene rendering templates according to this embodiment.

Scene rendering template 114 is made up of sets of director styles (element DirectorName), touch (attribute touch), genre (attribute genre) and rendering genre corresponding thereto related to a moving picture described in element DMPML of the structured scenario description. The rendering genre includes a configuration, sequence, and rendering of camera position and direction and so forth corresponding to the director style, touch and genre. The rendering genre is created and registered beforehand.

Figure 11:
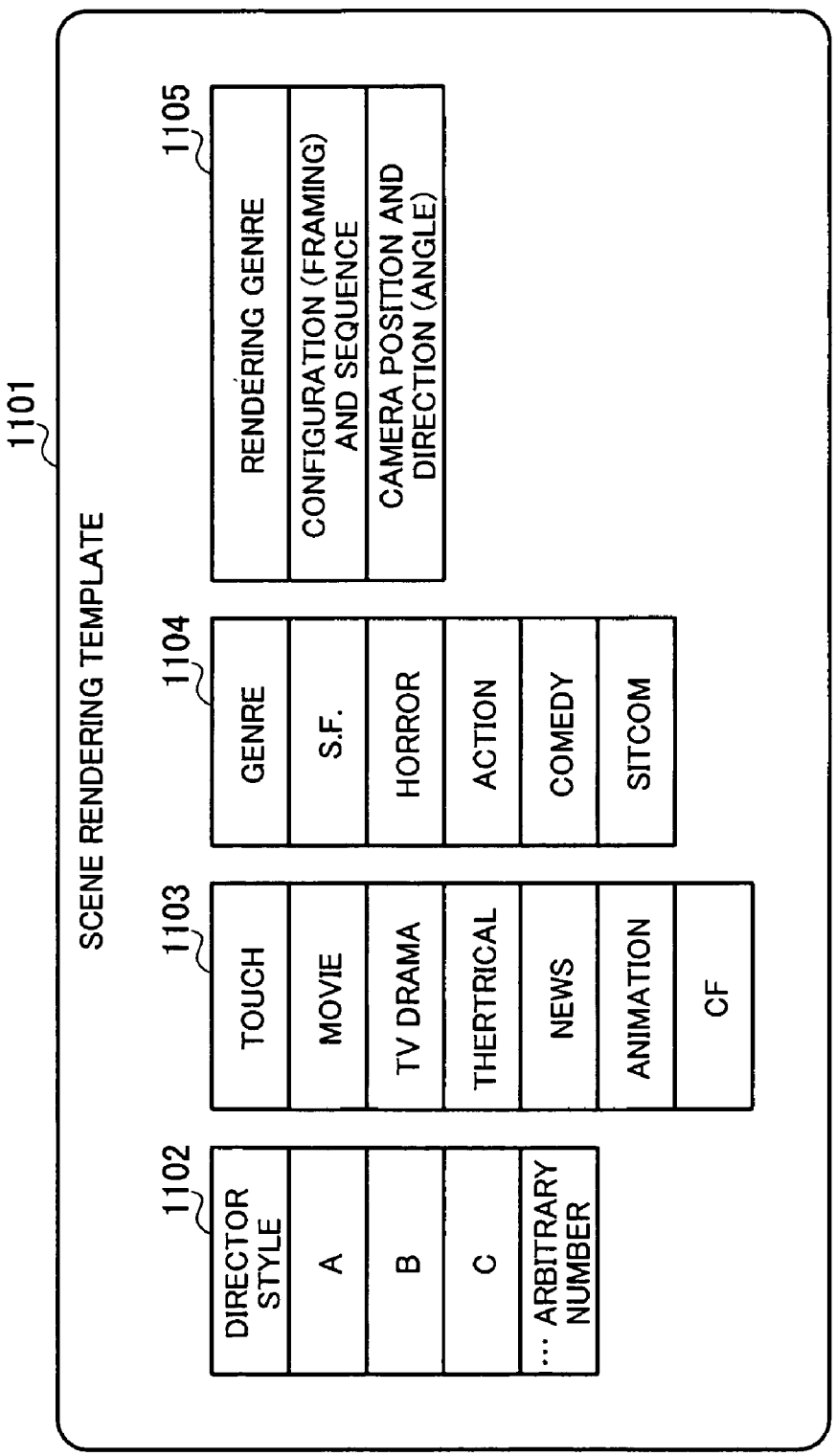
FIG. 11 is a first diagram showing a scene rendering template according to the above described embodiment.

For example, scene rendering template 1101 shown in FIG. 11 stores director style 1102, touch 1103, genre 1104 and rendering genre 1105 which is rendering setup.

Scene rendering template 1101 simply stores a list of director style 1102, touch 1103, genre 1104 and rendering genre 1105 which is information related to rendering. Scene rendering template 1101 is used by structure analysis section 102 to decide whether structured scenario description 101 includes information related to scene rendering or not.

Figure 12:
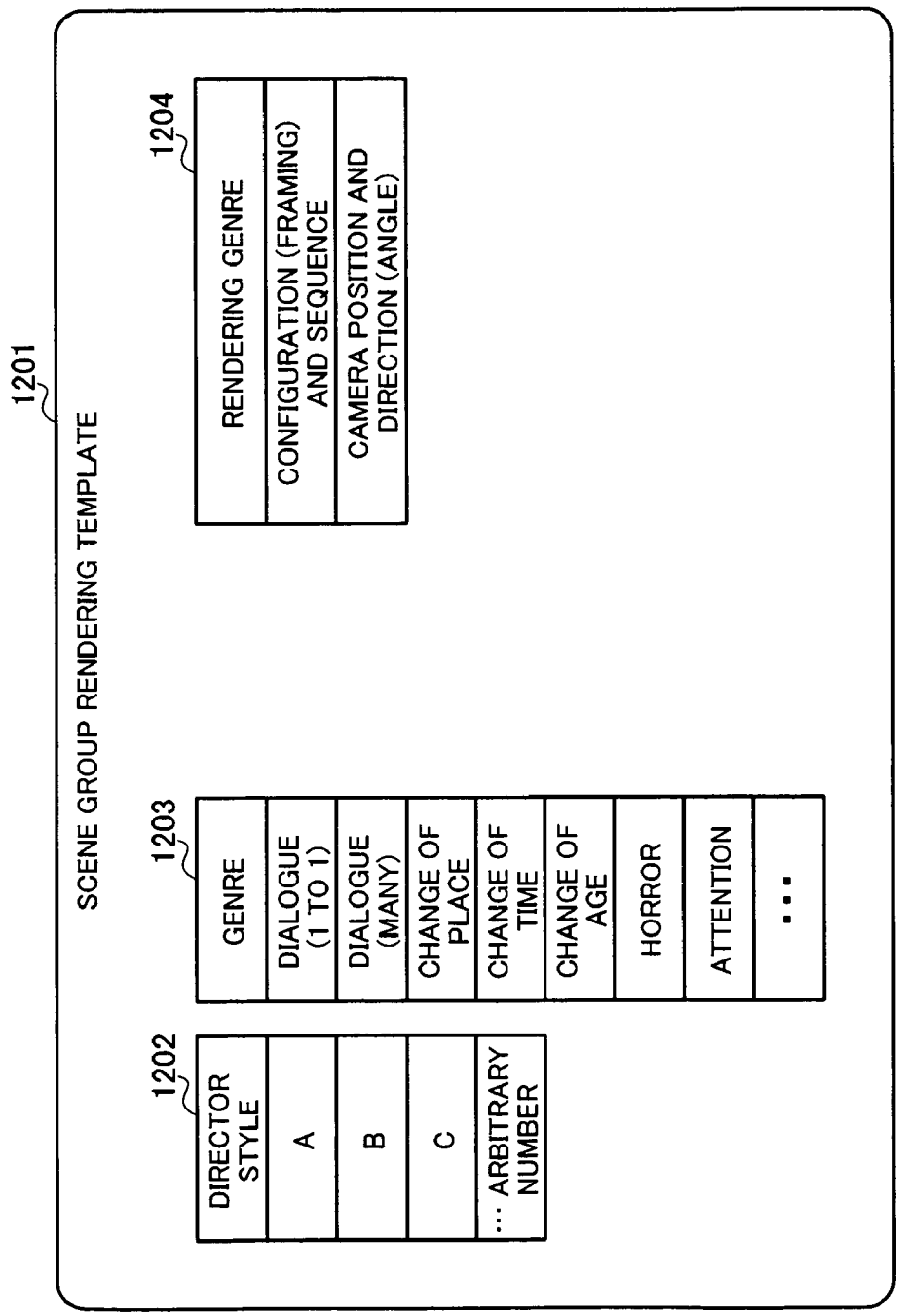
FIG. 12 is a second diagram showing the scene rendering template according to the above described embodiment.

Furthermore, scene group rendering template 1201 shown in FIG. 12 stores director style 1202, genre 1203 and rendering genre (rendering setup) 1204.

Scene group rendering template 1201 is used by structure analysis section 102 to decide whether structured scenario description 101 includes information related to rendering of a series of scene groups or not.

Furthermore, scene rendering group template example 1300 shown in FIG. 13 stores touch 1301 associated with rendering genre (rendering setup) 1302 corresponding to touch 1301.

Furthermore, scene rendering template example 1400 shown in FIG. 14 stores genre 1401 associated with rendering genre 1402 corresponding to genre 1401.

Furthermore, scene rendering template example 1500 shown in FIG. 15 stores director style 1501 associated with rendering genre (rendering setup) 1502 corresponding to director style 1501.

Scene rendering template examples 1300 to 1500 are used by moving picture configuration section 105 to add rendering to moving picture component 107.

Furthermore, scene rendering template example 1600 shown in FIG. 16 stores rendering genre (rendering setup) 1602 associated with a combination of director style 1601, touch 1603 and genre 1604.

Using scene rendering template example 1600 allows rendering to be produced with information related to a plurality of renderings taken into consideration.

Furthermore, default (scene) rendering template example 1700 shown in FIG. 17 stores scenario action 1701, shot group genre (rendering setup) 1702 and shot group adaptability ratio 1703 associated with one another. Scenario action 1701 corresponds to element Action of structured scenario description 101.

Shot group genre 1702 is rendering setup about what kind of camera shot is used for picture taking.

Furthermore, shot group adaptability ratio 1703 indicates adaptability of shot group genre 1702 with respect to scenario action 1701. That is, shot group adaptability ratio 1703 is a value that indicates which shot group genre (rendering setup) 1702 is suitable for predetermined scenario action 1701 or has been selected so far.

For example, in the case of default configuration (framing) and sequence rendering template example 1700, there is shot group genre 1702 including "full shot from right of person", "full shot from front of person" and "long shot" with respect to scenario action 1701 of "ride two-wheeled vehicle" and shot group adaptability ratio 1703 corresponding to "full shot from right of person" has the highest adaptability ratio, indicating that selecting this is most common.

Using default configuration (framing) and sequence rendering template 1700, moving picture configuration section 105 can produce appropriate rendering for a description of actions of a character.

Furthermore, configuration (framing) and sequence rendering template 1800 shown in FIG. 18 stores scenario action 1801, shot group genre (rendering setup) 1802 and shot group adaptability ratio 1803 associated with one another when touch (attribute touch) is Movie.

This example shows that when touch is Movie, shot group genre 1802 of waist shot is desirable for a scenario action of "ride two-wheeled vehicle."

Furthermore, configuration (framing) and sequence rendering template 1900 shown in FIG. 19 stores scenario action 1901, shot group genre (rendering genre) 1902 and shot group adaptability ratio 1903 associated with one another when touch (attribute touch) is TV Drama.

Using configurations (framing) and sequence rendering templates 1800, 1900, moving picture configuration section 105 can produce rendering with touch and character actions taken into consideration.

Furthermore, inter-scene configuration (framing) and sequence (between scenes) rendering template 2000 shown in FIG. 20 associates scenario action 2001, preceding scene shot group genre (rendering genre) 2002, following scene shot group genre (rendering genre) 2004, corresponding scene shot group genre (rendering setup) 2003 and shot group adaptability ratio 2005 with one another.

Shot group genre 2003 is a shot group genre of the corresponding scene when scenario action 2001, preceding scene shot group genre 2002 and following scene shot group genre 2004 are taken into consideration and shot group adaptability ratio 2005 indicates the adaptability ratio thereof.

Using inter-scene configuration (framing) and sequence rendering template 2000, moving picture configuration section 105 can produce rendering with preceding and following scene shot groups taken into consideration.

Configuration (framing) and sequence rendering template 2100 shown in FIG. 21 associates scenario action 2101 with corresponding shot group genre (rendering setup) 2102 and shot group adaptability ratio 2103.

Configuration (framing) and sequence rendering template 2100 describes many renderings as the shot group genre.

The scene rendering templates are configured as shown above.

For the above described scene rendering templates, the shot group genre mainly consists of camera work, but the camera position and direction (angle) may have similar templates or may consist of anything other than camera work. For example, the shot group genre can be an illumination setup, sound effect or anything if it at least relates to rendering of picture taking.

Figure 22:
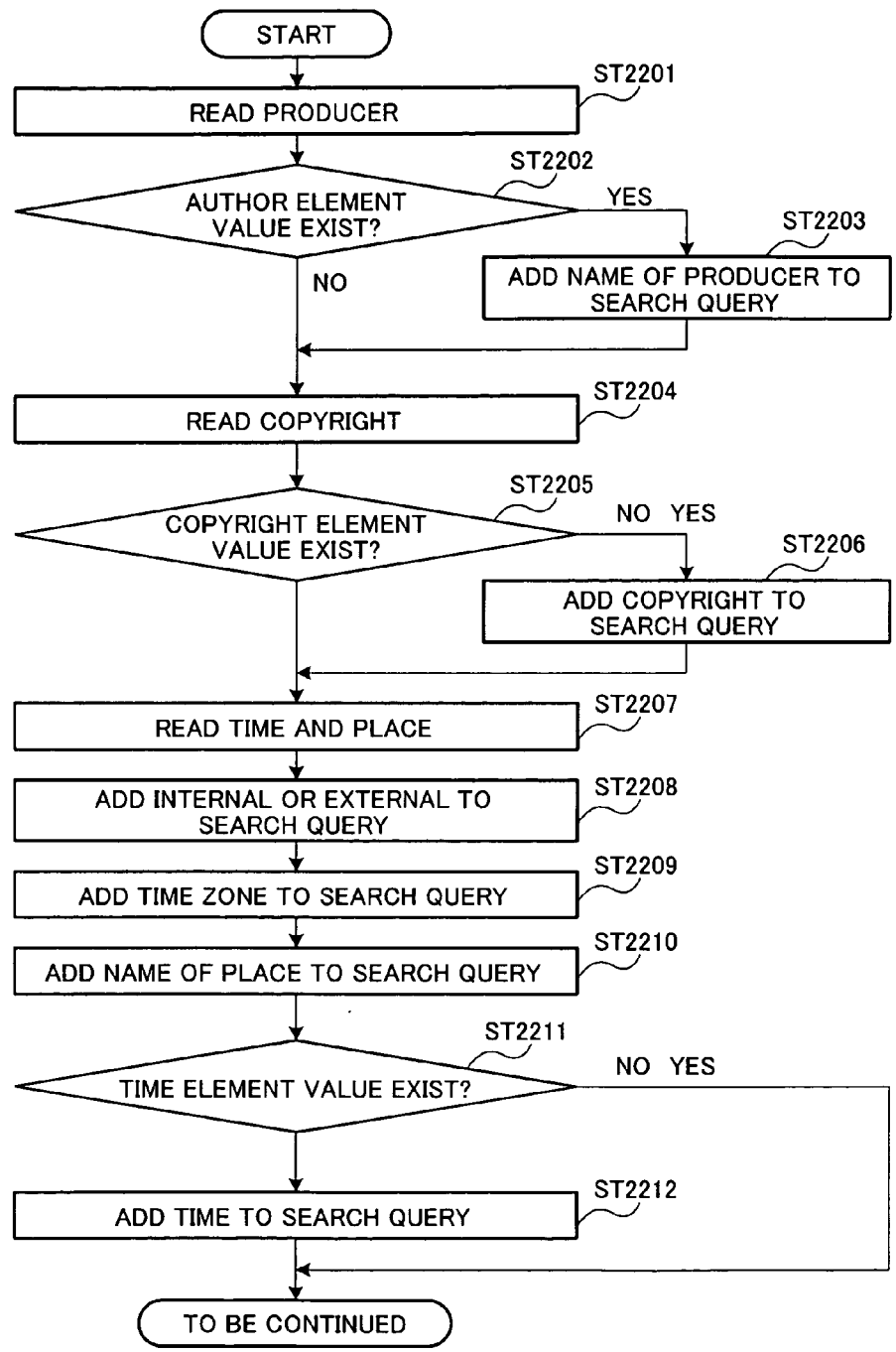
FIG. 22 is a first flow chart of processes for a structure analysis section according to the above described embodiment to create a moving picture component search query.
Figure 23:
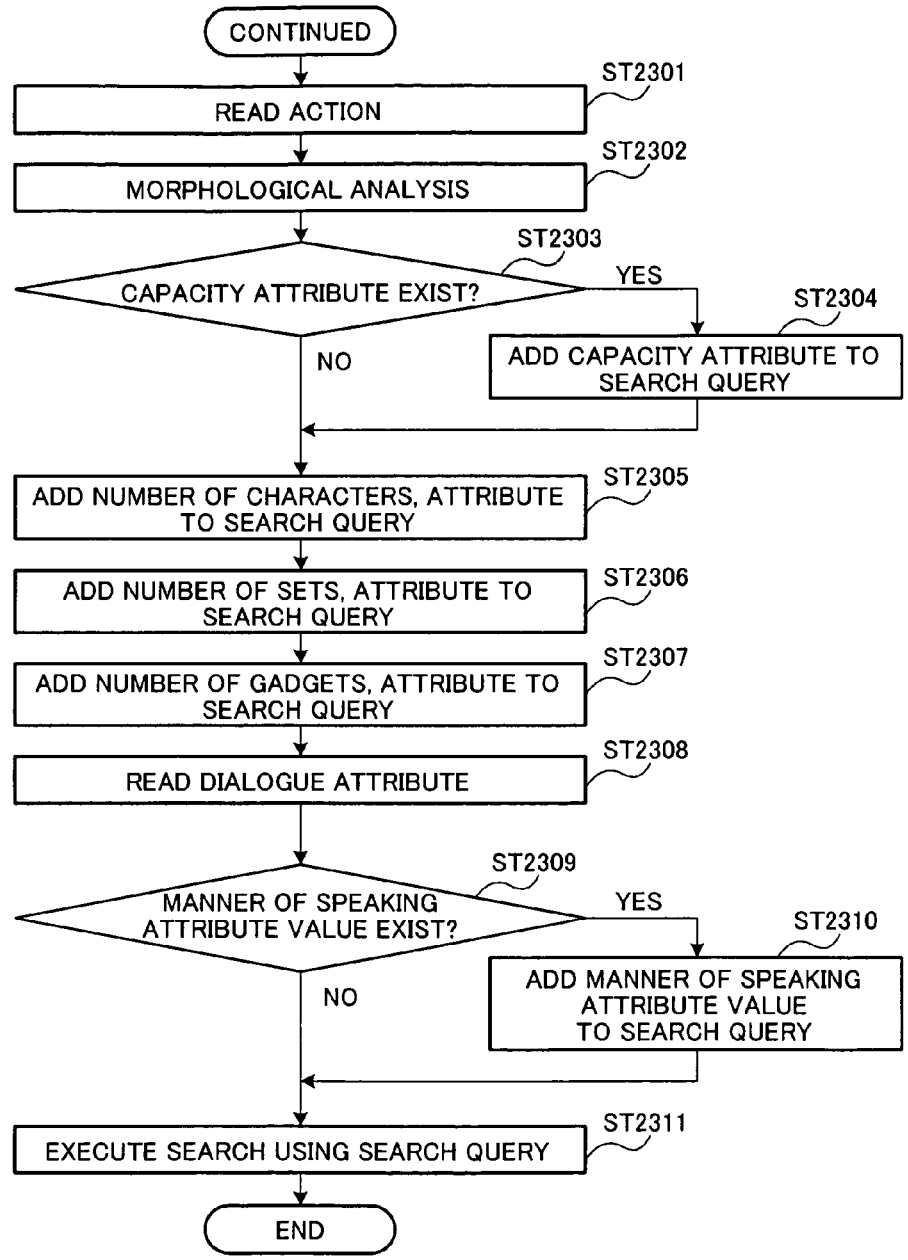
FIG. 23 is a second flow chart of processes for the structure analysis section according to the above described embodiment to create a moving picture component search query.

Next, the process for structure analysis section 102 to create moving picture component search query 103 will be explained using FIG. 22 and FIG. 23. FIG. 22 and FIG. 23 are flow charts of processes for structure analysis section 102 according to this embodiment to create moving picture component search query 103.

First, structure analysis section 102 inputs structured scenario description 101 and reads an Author node (element Author) who is the producer of input structured scenario description 101 (ST2201). For example, when structure analysis section 102 reads structured scenario description 1000, it reads the portion indicated by reference numeral 1007 in FIG. 10.

Then, structure analysis section 102 decides whether the Author node includes the element value, that is, the name of the producer (Koichi Emura in the example of FIG. 10) or not (ST2202), and if the Author node includes the element value, structure analysis section 102 adds the name of the producer to the moving picture component search query (ST2203).

Next, structure analysis section 102 reads the Copyright node (element Copyright) which is the copyright of input structured scenario description 101 (ST2204). For example, when structure analysis section 102 reads structured scenario description 1000, it reads the portion indicated by reference numeral 1008 in FIG. 10.

Then, structure analysis section 102 decides whether the Copyright node includes the element value, that is, copyright (Koichi Emura, 2001 in the example of FIG. 10) or not (ST2205), and if the Copyright node includes the element value, structure analysis section 102 adds the copyright to moving picture component search query (ST2206). Next, structure analysis section 102 reads the Slugline node (element Slugline) which is a description related to the time and place of input structured scenario description 101 (ST2207).

Next, structure analysis section 102 extracts INT. (internal), EXT. (external), I/E. (internal and external) which are the attribute values (e.g., portion indicated by reference numeral 1012 of structured scenario description 1000) of attribute place which is a description related to the place described in the Slugline node and adds them to moving picture component search query (ST2208). Next, structure analysis section 102 extracts NIGHT, DAWN, DUSK and so forth, which are the attribute values (e.g., portion indicated by reference numeral 1013 of structured scenario description 1000) of attribute timeOfDay which is the description related to the time zone described in the Slugline node and adds them to moving picture component search query (ST2209).

Next, structure analysis section 102 extracts LIVINGROOM which is a value of element BasicLocation (e.g. portion indicated by reference numeral 1014 of structured scenario description 1000) which is the description related to the place described in the Slugline node and adds it to moving picture component search query (ST2210).

Next, structure analysis section 102 decides whether there is element Time which is the description related to the time described in the Slugline node or not (ST2211) and if there is element Time, structure analysis section 102 extracts the value of element Time and adds it to moving picture component search query (ST2212).

Next, structure analysis section 102 reads the SceneDirection node (element SceneDirection) which is a description related to actions of input structured scenario description 101 (ST2301).

Next, structure analysis section 102 produce a morphological analysis of dividing the description of the SceneDirection node into phrases (ST2302).

For example, when the SceneDirection node has a description that "Michael's friend stands up and is going out of the room", structure analysis section 102 divides this into phrases "Michael's friend", "stands up", "is going out" and "of the room."

Next, structure analysis section 102 decides whether the phrases resulting from the division in ST2302 include the character or capacity attribute showing actions or not (ST2303).

For example, when there are phrases "Michael's friend", "stands up", "is going out", "of the room", structure analysis section 102 detects "Human (man or woman)", "stand up", "go out (walk)" and "room" as capacity attributes.

Then, when it decides in ST2303 that there is a capacity attribute, structure analysis section 102 adds the detected capacity attribute to moving picture component search query (ST2304).

Next, in ST2304, structure analysis section 102 converts the number of characters included in the capacity attribute added to the moving picture component search query and attributes thereof to general purpose terms using a thesaurus, adds them to the moving picture component search query (ST2305), converts the number of sets and attribute to general purpose terms using a thesaurus, adds them to the moving picture component search query (ST2306), converts the number of gadgets and attribute to general purpose terms using a thesaurus and adds them to the moving picture component search query (ST2307).

Next, structure analysis section 102 reads the Dialogue node (element Dialogue) (e.g., portions indicated by reference numerals 1016 to 1018 in FIG. 10) which is a description related to the dialogue of input structured scenario description 101 (ST2308).

Next, structure analysis section 102 decides whether the Dialogue node includes an attribute value about the manner of speaking (e.g., portion indicated by reference numeral 1021 in FIG. 10) or not (ST2309), and if the Dialogue node includes the attribute value, structure analysis section 102 adds attribute values of the manner of speaking such as Whispers, Joking, not joking, Calm, very calm, Excited, Revelently, Loudly, Lovingly, Yelling, Muttering, to other person, shouting to other person, saluting other person, Continuing, into the phone to the moving picture component search query (ST2310).

Then, structure analysis section 102 carries out the processes from ST2207 to ST2310 on all scenes (Scene node).

Then, structure analysis section 102 sends the moving picture component search query created as described above to moving picture component search section 104. Then, moving picture component search section 104 searches for moving picture components corresponding to the moving picture component search query sent from moving picture component database 106 (ST2311).

As shown above, structure analysis section 102 creates moving picture component search query 103 from input structured scenario description 101.

Figure 24:
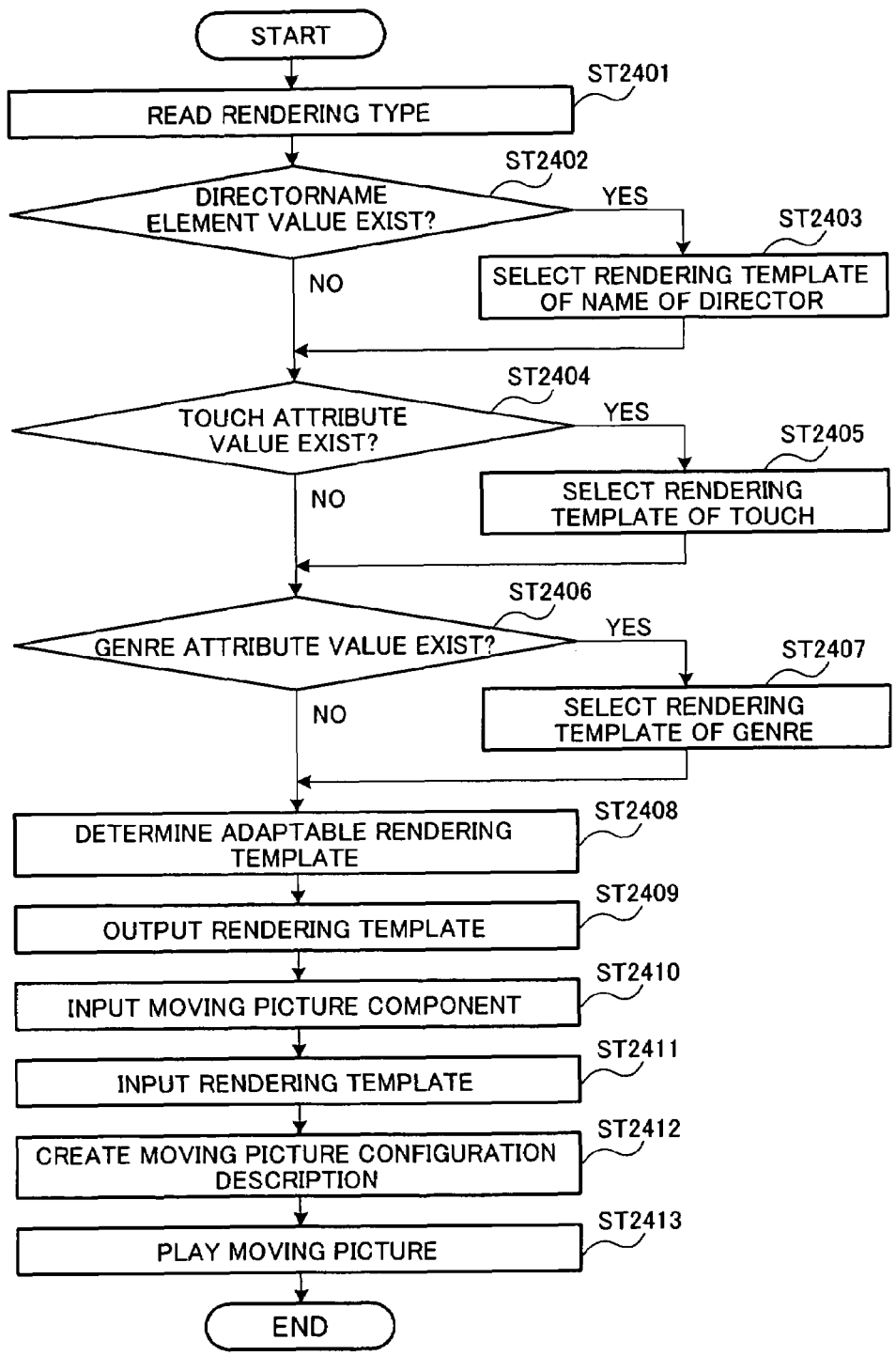
FIG. 24 is a flow chart of processes for the moving picture creation apparatus according to the above described embodiment to create a moving picture subjected to rendering from a structured scenario.

Next, processes for moving picture creation section 100 to create a moving picture from structured scenario description 101 will be explained using FIG. 24. FIG. 24 is a flow chart of processes for moving picture creation apparatus 100 according to this embodiment to create a moving picture for which rendering is added from a structured scenario. Here, processes of creating a moving picture for which the rendering corresponding to the name of the director, touch and genre described in structured scenario description 101 will be explained.

First, structure analysis section 102 of moving picture creation apparatus 100 inputs structured scenario description 101 and reads the Dramatics node (element Dramatics) which is a rendering type of input structured scenario description 101 (ST2401). For example, when structured scenario description 1000 is read, structure analysis section 102 reads the portion indicated by reference numeral 1001 in FIG. 10.

Next, structure analysis section 102 decides whether the rendering type read includes element DirectorName or not (ST2402).

When the rendering type read includes element DirectorName, structure analysis section 102 extracts the name of the director described in element DirectorName.

Then, structure analysis section 102 references scene rendering templates 1101, 1201 of rendering knowledge base 109 and decides whether the scene rendering template which describes the rendering genre corresponding to the extracted name of the director exists or not.

Then, when structure analysis section 102 decides that the scene rendering template which describes the rendering genre related to the extracted name of the director exists, structure analysis section 102 selects a scene rendering template which describes the rendering corresponding to the name of the director extracted from rendering knowledge base 109, for example, scene rendering template 1500 (ST2403).

Next, structure analysis section 102 decides whether the rendering type read includes attribute touch or not (ST2404).

When the rendering type read includes attribute touch, structure analysis section 102 extracts the attribute value (touch) described in attribute touch. Structure analysis section 102 references scene rendering templates 1101, 1201 of rendering knowledge base 109 and decides whether there is a scene rendering template which describes the rendering genre corresponding to extracted touch or not.

When structure analysis section 102 decides that there is a scene rendering template which describes the rendering genre corresponding to the extracted touch, structure analysis section 102 selects a scene rendering template which describes the rendering corresponding to the extracted touch from rendering knowledge base 109, for example, scene rendering template 1300 (ST2405).

Next, structure analysis section 102 decides whether attribute genre exists in the rendering type read or not (ST2406).

When attribute genre exists in the rendering type read, structure analysis section 102 extracts an attribute value (genre) described in attribute genre. Then, structure analysis section 102 references scene rendering templates 1101, 1201 of rendering knowledge base 109 and decides whether there is a scene rendering template which describes the rendering genre corresponding to the extracted genre or not.

When structure analysis section 102 decides that there is a scene rendering template which describes the rendering genre corresponding to the extracted genre, structure analysis section 102 selects a scene rendering template which describes the rendering corresponding to the extracted genre, for example, scene rendering template 1400 from rendering knowledge base 109 (ST2407).

Next, when a plurality of scene rendering templates are selected in the above described step, structure analysis section 102 determines a scene rendering template having highest adaptability (ST2408).

For example, when the name of the director, touch and genre are described in structured scenario description 101, a scene rendering template having all of them, for example, scene rendering template 1600 is selected.

Furthermore, it is also possible to give priority to scene rendering templates and select a scene rendering template based on this priority.

Next, structure analysis section 102 outputs information capable of identifying the selected scene rendering template to moving picture configuration section 105 (ST2409). On the contrary, moving picture configuration section 105 inputs moving picture component 107 for structured scenario description 101 searched by moving picture component search section 104 (ST2410) and inputs the scene rendering template selected by structure analysis section 102 (ST2411).

Next, moving picture configuration section 105 creates moving picture configuration description 110 by adding the rendering genre described in the input scene rendering template to input moving picture component 107 (ST2212). Then, moving picture configuration section 105 sends moving picture configuration description 110 created to moving picture play section 111.

In response to this, moving picture play section 111 inputs moving picture configuration description 110 sent, extracts data for creating an actual picture for the input moving picture configuration description from moving picture component database 106, generates final moving picture 112 using the extracted data and sends it to display section 108.

Then, display section 108 plays final moving picture 112 sent (ST2413).

When the user likes final moving picture 112 displayed on display section 108, the user inputs such information from operation section 113 and when the user does not like it, the user performs operation to change the undesired portion, that is, the moving picture component or scene rendering template.

Moving picture configuration section 105 which has received this input creates moving picture configuration description 110 using the moving picture component or scene rendering template changed by the user again.

As shown above, structure analysis section 102 selects a scene rendering template suitable for the director, touch or genre described in structured scenario description 101 and can create a moving picture configuration description with the rendering described in the scene rendering template selected by moving picture configuration section 105 added thereto.

Furthermore, what should be noted here is that the user provides a description which is different from the setup related to the actual rendering such as the name of the director, touch and genre in structured scenario description 101, and can thereby create a moving picture with rendering suitable for the name of the director, touch and genre added thereto.

Actually, rendering requires skilled knowledge, experience and meticulous setup such as camera work. For this reason, it is difficult for common people to perform setups related to effective rendering and it is not easy to provide a description related to such effective rendering.

However, using the present invention allows common people to produce effective rendering on a moving picture without special knowledge.

This embodiment adopts a mode in which structure analysis section 102 selects scene rendering template 114, but the embodiment can also be adapted in such a way that moving picture configuration section 105 selects scene rendering template 114.

Figure 25:
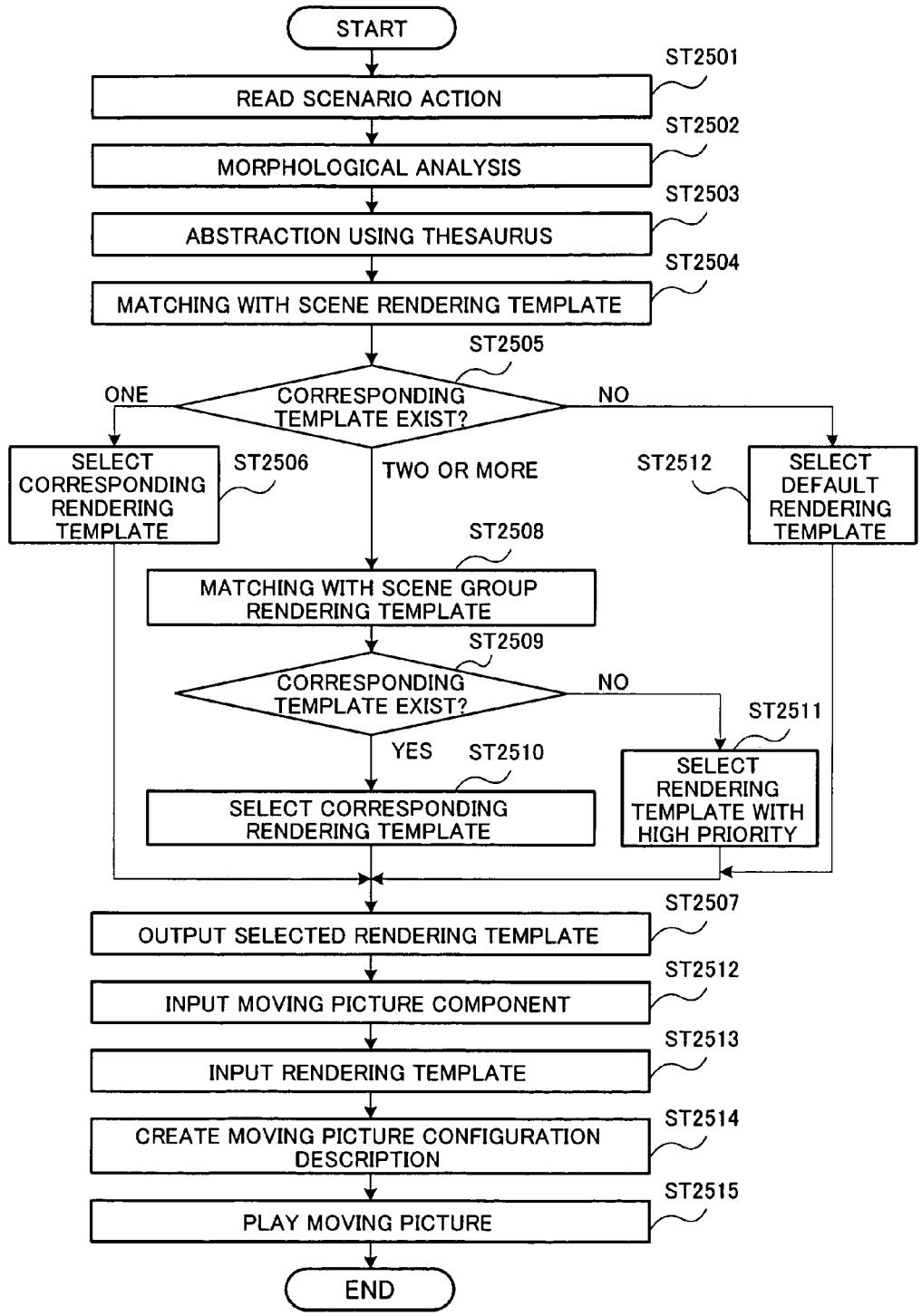
FIG. 25 is a flow chart other processes for the moving picture creation apparatus according to the above described embodiment to create a moving picture subjected to rendering from a structured scenario.

Next, another process for moving picture creation section 100 to create a moving picture from structured scenario description 101 will be explained in detail using FIG. 25. FIG. 25 is a flow chart showing another process for moving picture creation apparatus 100 according to this embodiment to create a moving picture with rendering added from a structured scenario. This section will explain a process of creating a moving picture with rendering corresponding to a description related to actions of a scenario described in structured scenario description 101.

First, structure analysis section 102 of moving picture creation apparatus 100 inputs structured scenario description 101 and reads the SceneDirection node (element SceneDirection) which is a scenario action of input structured scenario description 101 (ST2501). For example, when structured scenario description 1000 is read, structure analysis section 102 reads the portion indicated by reference numeral 1015 in FIG. 10.

Next, structure analysis section 102 performs a morphological analysis of the scenario action read (ST2502). For example, when the scenario action read is a description such as "jump on a bicycle", structure analysis section 102 performs a morphological analysis and divides the description "jump on a bicycle" into phrases "bicycle", "jump" and "on."

Next, structure analysis section 102 abstracts the phrases analyzed in ST2502 into general words using a thesaurus (not shown) (ST2503). For example, structure analysis section 102 abstracts "bicycle", "jump" and "on" to "two-wheeler" and "jump."

Next, structure analysis section 102 performs matching between the phrases abstracted in ST2503 and scene rendering template 114 of rendering knowledge base 109 (ST2504). That is, structure analysis section 102 examines whether there is any scene rendering template 114 which stores the phrases abstracted in ST2503 (ST2505).

Then, when it is decided in ST2505 that there is one scene rendering template 114 corresponding to the abstracted-phrase, structure analysis section 102 selects corresponding scene rendering template 114 (ST2506) and outputs information which identifies the selected scene rendering template to moving picture configuration section 105 (ST2507).

On the other hand, when it is decided in ST2505 that there are two or more scene rendering templates 114 corresponding to the abstracted phrase, structure analysis section 102 moves to a process of selecting the most appropriate scene rendering template from a plurality of corresponding scene rendering templates.

First, structure analysis section 102 inputs structured scenario description 101, reads the Dramatics node (element Dramatics) which is the rendering type of input structured scenario description 101 and decides whether the read rendering type includes element DirectorName (director style), attribute touch (touch) and attribute genre (genre) or not.

When it is decided that there are element DirectorName (director style), attribute touch (touch) and attribute genre (genre), structure analysis section 102 performs matching between the rendering type, scenario action and scene (group)/scene rendering template (ST2508) and decides whether there is any scene (group)/scene rendering template which takes both the rendering type and scenario action into consideration or not (ST2509).

When it is decided that there is a scene (group)/scene rendering template which takes both the rendering type and scenario action into consideration, structure analysis section 102 selects the corresponding scene rendering template (ST2510) and sends information which identifies the selected scene rendering template to moving picture configuration section 105 (ST2507).

On the other hand, when it is decided that there is no scene (group)/scene rendering template which takes both the rendering type and scenario action into consideration, structure analysis section 102 selects one with the highest priority from among the plurality of matched scene rendering templates in ST2504 (ST2511) and outputs information which identifies the selected scene rendering template to moving picture configuration section 105 (ST2507). Suppose that the scene rendering templates are assigned priority.

In ST2508, it is also possible to decide whether, for example, there is scene rendering template 2000 shown in FIG. 20 which takes the preceding and following scenes into consideration or not.

On the other hand, if it is decided in ST2505 that there is no scene rendering template 114 corresponding to the abstracted phrases, a scene rendering template prepared as the default is selected (ST2516) and information which identifies the selected scene rendering template is sent to moving picture configuration section 105 (ST2507).

When structured scenario description 101 includes attribute camera shot, attribute cameraMovement or attribute cameraPosition in ST2512, it is also possible to use their rendering instead of using the scene rendering template.

Next, moving picture configuration section 105 inputs moving picture component 107 for structured scenario description 101 searched by moving picture component search section 104 (ST2512) and inputs the scene rendering template selected by structure analysis section 102 (ST2513).

Next, moving picture configuration section 105 creates moving picture configuration description 110 obtained by adding rendering genre described in the input scene rendering template to input moving picture component 107 (ST2514). Then, moving picture configuration section 105 sends moving picture configuration description 110 created to moving picture play section 111.

On the contrary, moving picture play section 111 inputs moving picture configuration description 110 sent, extracts data for generating an actual picture corresponding to the input moving picture configuration description from moving picture component database 106, generates final moving picture 112 using the extracted data and sends it to display section 108.

Then, display section 108 plays final moving picture 112 sent (ST2515).

If the user likes final moving picture 112 displayed on display section 108, the user inputs such information from operation section 113 and if the user does not like final moving picture 112, the user performs operation to change the undesired portion, that is, the moving picture component or scene rendering template.

Thus, the user can visually confirm final moving picture 112 using display section 108 and change the moving picture component or scene rendering template corresponding to final moving picture 112 as required.

This allows a moving picture to be edited simply and effectively without rewriting structured scenario description 101.

Then, moving picture configuration section 105 which has received this input creates moving picture configuration description 110 using the moving picture component or scene rendering template changed by the user again.

As shown above, structure analysis section 102 selects appropriate scene rendering template corresponding to the scenario action described in structured scenario description 101 and can create a moving picture configuration description subjected to the rendering described in the scene rendering template selected by moving picture configuration section 105.

Furthermore, what should be noted here is that it is possible to create a moving picture with appropriate rendering corresponding to a scenario action added without the user's giving a particular description related to the rendering in structured scenario description 101.

Actually, rendering requires skilled knowledge, experience and meticulous setup such as camera work. For this reason, it is difficult for common people to perform setups related to effective rendering and it is not easy to provide a description related to such effective rendering.

However, using the present invention allows the user to automatically produce effective rendering on a moving picture without special knowledge.

As explained so far, according to this embodiment, the user can easily create a moving picture with effective rendering added without professional knowledge of rendering.

Furthermore, according to this embodiment, it is possible to store scene rendering template 114 associated with information related to rendering and a rendering setup in rendering knowledge base 109 beforehand. That is, it is possible to create and store scene rendering templates by experts having special knowledge beforehand and produce rendering similar to the rendering by the experts. Furthermore, it is also possible to store scene rendering templates 114 by different experts and thereby widen the range of rendering.

Rendering knowledge base 109 may be located inside moving picture creation apparatus 100 or outside moving picture creation apparatus 100, for example, in a space on the Internet.

According to this embodiment, it is also possible to make a setup about rendering in structured scenario description 101. This allows an expert of rendering and so forth to directly describe his/her own desired rendering in structured scenario description 101.

It is also possible to adopt a mode in which operations carried out by moving picture creation apparatus 100 are formed into a program so that a computer executes the program.

This application is based on Japanese Patent Application No. 2003-278401 filed on Jul. 23, 2003, the entire content of which is expressly incorporated by reference herein.

INDUSTRIAL APPLICABILITY

As described above, according to the present invention, it is possible to extract information related to rendering from structured scenario description 101, extract a rendering setup corresponding to the extracted information related to the rendering from a rendering knowledge base and add effective rendering to a moving picture using the extracted rendering setup. Thus, the moving picture subjected to such effective rendering has a wide application range such as transmission of information and communication and can be widely used.

The invention claimed is:

1. A moving picture creation apparatus for creating a moving picture from character strings, the apparatus comprising:
    a structure analysis section that receives a structured scenario description including information related to objects and information related to rendering, and extracts the information related to the objects and the rendering from the structured scenario description;
    a moving picture component search section that extracts moving picture components corresponding to the extracted information related to the objects; and
    a moving picture configuration section that extracts a rendering setup corresponding to the extracted information related to rendering, and creates a moving picture configuration description using the rendering setup extracted for the moving picture components corresponding to the information related to the objects.

2. The moving picture creation apparatus according to claim 1, further comprising a rendering knowledge base that stores rendering templates which associate information related to rendering with the rendering setup corresponding to the information related to rendering,
    wherein said moving picture configuration section extracts a rendering setup corresponding to the information related to rendering extracted from said rendering knowledge base.

3. The moving picture creation apparatus according to claim 1, wherein the information related to rendering comprises information related to a director name, touch or genre, and the rendering setup comprises a rendering setup corresponding to the director name, touch or genre.

4. The moving picture creation apparatus according to claim 1, wherein the information related to rendering comprises a description related to at least one of positions of objects, actions and picture taking method, and the rendering setup comprises a rendering setup corresponding to the actions.

5. The moving picture creation apparatus according to claim 1, wherein the structured scenario is a structured description of the information related to the objects and the rendering.

6. The moving picture creation apparatus according to claim 1, further comprising:
   a moving picture playing section that generates a moving picture from the moving picture configuration description;
   a display section that displays the moving picture; and
   an operation section that enters information that changes the rendering setup for the moving picture displayed.

7. The moving picture creation apparatus according to claim 1, further comprising:
   a moving picture playing section that generates a moving picture from the moving picture configuration description;
   a display section that displays the moving picture; and
   an operation section that enters information that changes the moving picture components used for the moving picture displayed.

8. A moving picture creation method for creating a moving picture from character strings, the method comprising:
   inputting a structured scenario description describing information related to objects and rendering;
   extracting the information related to objects and rendering from the structured scenario description;
   extracting moving picture components corresponding to the extracted information related to the objects; extracting a rendering setup corresponding to the extracted information related to the rendering; and
   creating a moving picture configuration description using the rendering setup extracted for the moving picture components corresponding to the information related to the objects.

* * * * *

UNITED STATES PATENT AND TRADEMARK OFFICE
CERTIFICATE OF CORRECTION

PATENT NO. : 7,382,372 B2
APPLICATION NO. : 10/565513
DATED : June 3, 2008
INVENTOR(S) : Koichi Emura et al.

Page 1 of 1

It is certified that error appears in the above-identified patent and that said Letters Patent is hereby corrected as shown below:

On the Title Page, at Item (73), Assignee, the following Assignees were omitted and should be included:

--Hiroshi Yasuda, Yokohama (JP)--

--Terumasa Aoki, Kamifukuoka (JP)--

Signed and Sealed this

Twenty-fourth Day of February, 2009

JOHN DOLL
*Acting Director of the United States Patent and Trademark Office*